US012792972B2

(12) United States Patent
Karpathy

(10) Patent No.: US 12,792,972 B2
(45) Date of Patent: Nov. 10, 2026

(54) SYSTEM AND METHOD FOR OBTAINING TRAINING DATA

(71) Applicant: Tesla, Inc., Palo Alto, CA (US)

(72) Inventor: Andrej Karpathy, San Francisco, CA (US)

(73) Assignee: Tesla, Inc., Palo Alto, CA (US)

(*) Notice: Subject to any disclaimer, the term of this patent is extended or adjusted under 35 U.S.C. 154(b) by 621 days.

(21) Appl. No.: 17/250,825

(22) PCT Filed: Sep. 13, 2019

(86) PCT No.: PCT/US2019/051121
§ 371 (c)(1),
(2) Date: Mar. 5, 2021

(87) PCT Pub. No.: WO2020/056331
PCT Pub. Date: Mar. 19, 2020

(65) Prior Publication Data

US 2021/0271259 A1 Sep. 2, 2021

Related U.S. Application Data

(60) Provisional application No. 62/731,651, filed on Sep. 14, 2018.

(51) Int. Cl.
*G06N 20/00* (2019.01)
*G05D 1/00* (2024.01)
(Continued)

(52) U.S. Cl.
CPC ........... *G06N 20/10* (2019.01); *G05D 1/0246* (2013.01); *G06V 10/764* (2022.01);
(Continued)

(58) Field of Classification Search
CPC ..................... G05D 1/0246; G05D 2201/0213
See application file for complete search history.

(56) References Cited

U.S. PATENT DOCUMENTS 9,015,093 B1 4/2015 Commons et al.
9,542,626 B2 * 1/2017 Martinson .............. G06V 10/82
(Continued)

FOREIGN PATENT DOCUMENTS

CN 101599126 A 9/2012
CN 105320957 2/2016
(Continued)

OTHER PUBLICATIONS

Alain et al., Oct. 14, 2016, Understanding intermediate layers using linear classifier probes, arxiv.org, arxiv:1610.1644v3 [stat.ML], 9 pp.
(Continued)

*Primary Examiner* — Aaron G Cain
(74) *Attorney, Agent, or Firm* — Foley & Lardner LLP

(57) ABSTRACT

Systems and methods for obtaining training data are described. An example method includes receiving sensor and applying a neural network to the sensor data. A trigger classifier is applied to an intermediate result of the neural network to determine a classifier score for the sensor data. Based at least in part on the classifier score, a determination is made whether to transmit via a computer network at least a portion of the sensor data. Upon a positive determination, the sensor data is transmitted and used to generate training data.

20 Claims, 8 Drawing Sheets

(51) Int. Cl.

| | |
|---|---|
| ***G06N 20/10*** | (2019.01) |
| ***G06V 10/764*** | (2022.01) |
| ***G06V 10/774*** | (2022.01) |
| ***G06V 10/82*** | (2022.01) |
| ***G06V 20/00*** | (2022.01) |
| ***G06V 20/56*** | (2022.01) |
| ***G06V 20/58*** | (2022.01) |

(52) U.S. Cl.
CPC ............ *G06V 10/774* (2022.01); *G06V 10/82* (2022.01); *G06V 20/56* (2022.01); *G06V 20/58* (2022.01)

(56) References Cited

U.S. PATENT DOCUMENTS

| | | | |
|---|---|---|---|
| 9,875,440 B1 * | 1/2018 | Commons | G06N 3/092 |
| 2008/0129475 A1 | 6/2008 | Breed et al. | |
| 2016/0086078 A1 | 3/2016 | Ji et al. | |
| 2016/0180195 A1 * | 6/2016 | Martinson | G06V 10/764 382/103 |
| 2017/0046510 A1 | 2/2017 | Chen et al. | |
| 2017/0091617 A1 | 3/2017 | Baughman | |
| 2018/0004210 A1 | 1/2018 | Iagnemma | |
| 2018/0093671 A1 | 4/2018 | Allan et al. | |
| 2018/0173971 A1 | 6/2018 | Jia et al. | |

FOREIGN PATENT DOCUMENTS

| | | | |
|---|---|---|---|
| CN | 106529485 | A | 3/2017 |
| CN | 107766876 | A | 3/2018 |
| CN | 107818335 | A | 3/2018 |
| CN | 107977074 | A | 6/2021 |
| EP | 2897081 | A1 | 7/2015 |
| JP | 2015-135552 | | 7/2015 |
| JP | 2015-135552 | A | 7/2015 |
| JP | 2017-069917 | A | 4/2017 |
| JP | 2018-026040 | A | 2/2018 |
| JP | 2018-055259 | | 4/2018 |
| JP | 2018-060268 | | 4/2018 |
| JP | 2018-125777 | | 8/2018 |
| KR | 10-2018-0055708 | | 5/2018 |
| KR | 20180069452 | A | 6/2018 |
| WO | WO 17/175282 | | 2/2019 |

OTHER PUBLICATIONS

Bojarski et al., Apr. 25, 2016, End to end learning for self-driving cars, arxiv.org, arXiv:1604/07316v1 [cs.CV] Cornell University Library, 9 pp.
Eliot, Feb. 27, 2018, Over-the-air (OTA) updating for AI self-driving cars—AI trends, https://aitrends.com/ai-insider/air-ota-updating-ai-self-driving cars/, 10 pp.
International Search Report and Written Opinion dated Nov. 26, 2019 in application No. PCT/US19/51121.
Chinese Office Action on CN Appl. No. 201980060070.7 dated Jun. 19, 2023 (21 pages with English language translation).
European Office Action on EP Application No. 19859523.3 dated Oct. 25, 2023 (17 pages).
Extended European Search Report on EP Appl. No. 19859523.3 dated May 12, 2022 (13 pages).
International Preliminary Report on Patentability on PCT Appl. No. PCT/US2019/051121, mailed Nov. 26, 2019 (6 pages).
Japanese Notice of Allowance on JP Appl. No. 2021-513897 dated Dec. 20, 2022 (3 pages with English language translation).
Japanese Office Action on JP Appl. No. 2021-513897 dated Apr. 26, 2022 (7 pages with English language translation).
Korean Office Action on KR Appl. No. 10-2021-7007900 dated Aug. 29, 2022 (14 pages w. English translation).
Korean Office Action on KR Appl. No. 10-2023-7017871 dated Jul. 18, 2023 (7 pages with English language translation).
Notice of Allowance on KR Appl. No. 10-2021-7007900 dated Mar. 28, 2023 (9 pages with English language translation).
Foreign Action other than Search Report on JP Patent Application No. 2023-017625 dated Feb. 13, 2024 (5 pages).
Second Office Action on CN App. 201980060070.7 dated Dec. 12, 2023 (23 pages).
Notice of Grant on CN Application No. 201980060070.7 DTD Mar. 15, 2024.
Alain Guillaume et al: “Understanding intermediate layers using linear classifier probes”, 2016, pp. 1-9, XP055917199, arXiv.org, Retrieved from the Internet URL:https://arxiv.org/pdf/1610.01644v3.pdf.
European Search Report on EP Appl. No. 25178983.0 dated Aug. 26, 2025.
Japanese Office Action on JP Patent Appl. No. 2024-102610 dated Sep. 30, 2025.
Alain et al: “Understanding intermediate layers using linear classifier probes”, Nov. 22, 2018 arXiv:1610.01644v4, pp. 1-13.
EP Opposition on EP Appl. No. 19859523.3 dated Feb. 24, 2026 (with English translation, 64 pages).
Communication pursuant to Article 94(3) EPC on EP Appl. No. 25178983.0 dated Jul. 1, 2026 (15 pages).

* cited by examiner

SYSTEM AND METHOD FOR OBTAINING TRAINING DATA

CROSS-REFERENCE TO RELATED APPLICATIONS

This application incorporates by reference herein the entirety of U.S. Prov. App. No. 62/731,651, filed Sep. 14, 2018 and entitled "NEURAL NETWORK TRAINING", which is hereby incorporated herein by reference in its entirety.

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to systems and techniques for machine learning. More specifically, the present disclosure relates to techniques for generation of training data.

BACKGROUND

Deep learning systems used for applications such as autonomous driving are developed by training a machine learning model. Typically, the performance of the deep learning system is limited at least in part by the quality of the training set used to train the model. In many instances, significant resources are invested in collecting, curating, and annotating the training data. The effort required to create the training set can be significant and is often tedious. Moreover, it is often difficult to collect data for particular use cases that a machine learning model needs improvement on.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
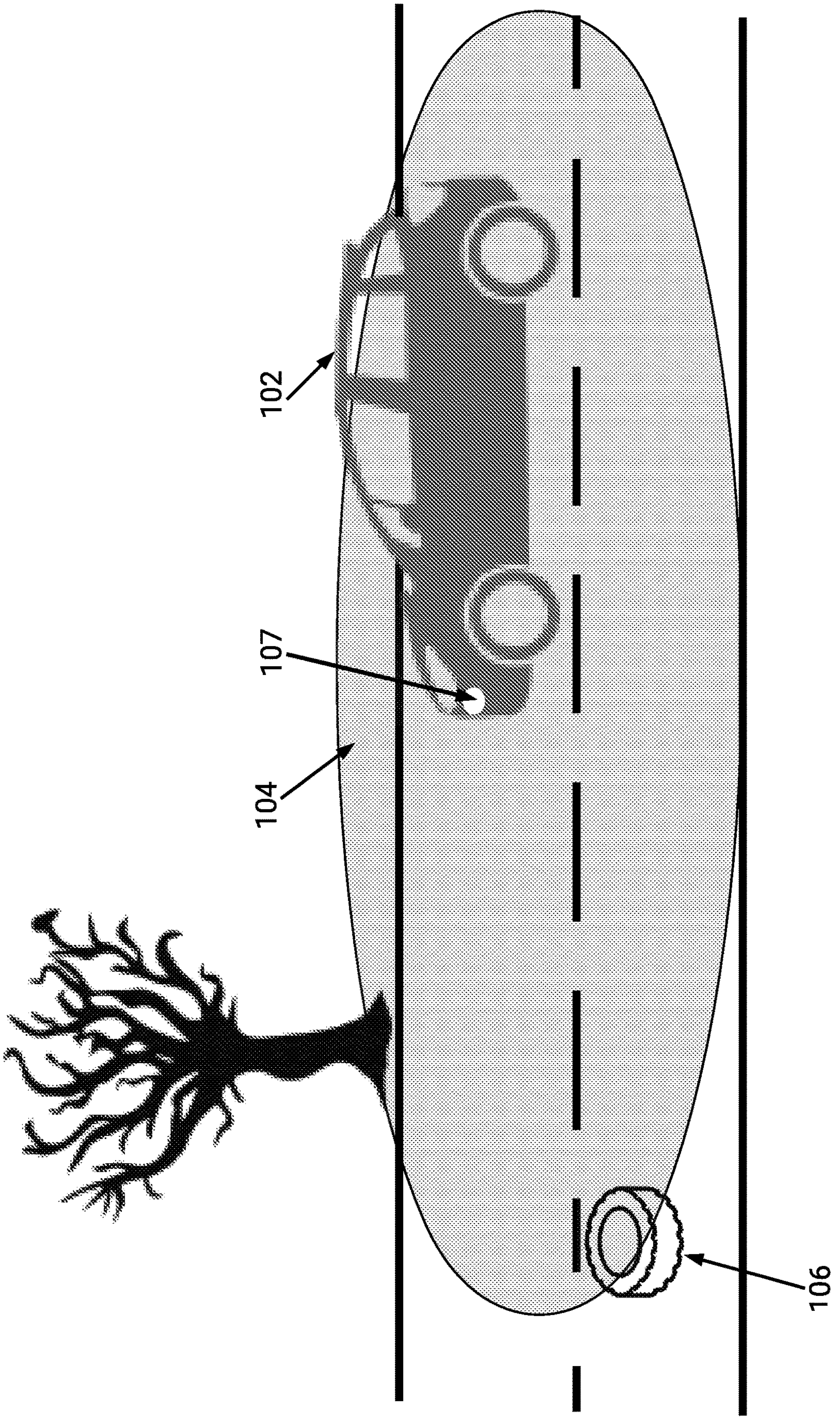
FIG. 1A is a schematic diagram illustrating an automobile driving on a road and detecting a tire positioned on the road.

One or more innovations are described herein, which can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the innovations may take, may be referred to as techniques. In general, the order of the steps of disclosed processes may be altered within the scope of the innovations. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the one or more innovations is provided below along with accompanying figures that illustrate the principles of the innovations. The innovations are described in connection with such embodiments, but the innovations are not limited to any embodiment. The scope of the innovations are limited only by the claims and the innovations encompass numerous alternatives, modifications and equivalents. Numerous specific details are set forth in the following description in order to provide a thorough understanding of the innovations. These details are provided for the purpose of example and the innovations may be practiced according to the claims without some or all of these specific details. For the purpose of clarity, technical material that is known in the technical fields related to the innovations have not been described in detail so that the innovations are not unnecessarily obscured.

INTRODUCTION

This specification describes innovations which, at least, address the following technical problems. Effective machine learning techniques rely upon training data sets which are used to inform underlying machine learning models. For example, a neural network may be trained using thousands, hundreds of thousands, millions, and so on, of examples. During training, these examples may be used to adjust parameters of the neural network (e.g., weights, biases, and so on). Additionally, these examples may be used to adjust hyperparameters of the neural network (e.g., a number of layers). Thus, access to training data is a constraint on the use of such machine learning techniques.

As machine learning models grow more complex, such as deeper neural networks, the necessity of large training data sets increases accordingly. These deeper neural networks may require a greater number of training examples as compared to shallower neural networks to ensure that their generalizability is high. For example, while a neural network may be trained to be highly accurate with respect to training data, the neural network may not generalize well to unseen future examples. In this example, the neural network may benefit from additional examples included in training data.

It may be appreciated that obtaining training data may present enormous technical hurdles. For example, certain machine learning models may be used to classify features or objects included in images. In this example, a machine learning model may learn to recognize a first object (e.g., a car) from a second object (e.g., a stop sign). The effectiveness of these machine learning models may be constrained according to the number of examples of the features or objects. For example, an entity may desire the machine learning model to recognize a bike being ridden on the street. As another example, the entity may desire the machine learning model to recognize a bike being carried on a back of a car. Absent sufficient training examples of these examples, the machine learning model may not be sufficiently accurate in its recognition to be usable. In general, an entity may be required to spend great efforts having persons label images for inclusion of certain features or objects. For example, the persons may have to manually review images and then assign labels to portions of the images as corresponding to certain features or objects.

One embodiment is a system and method that addresses this problem by rapidly generating training data. In one embodiment, the training data may include examples of any desired learnable feature. With respect to computer vision, training data may be rapidly generated which includes examples of any desired object or feature in images. These objects or features may represent typically tough to identify 'edge cases.' For example, training data may be generated which includes images of complex scenes desired by an entity. In this example, the entity may prefer to obtain images depicting bikes on the back or front of vehicles (e.g., a bike being carried in a front-rack of a public bus).

The above-described entity may leverage a multitude (e.g., thousands, millions) of vehicles which are traveling about various roads, or otherwise navigable areas, of the world. These vehicles may include, or otherwise have access to, sensors (e.g., cameras). As these vehicles travel about, they may capture sensor information. For example, the sensor information may be captured in the normal course of operation of the vehicles. The sensor information may be used by the vehicles for certain automated driving features, such as lane navigation. However, in one embodiment, the system includes circuits and software that allows the vehicles to collect examples of image features or objects desired by the entity to be used as training data for machine learning systems.

For example, classifiers (e.g., small or shallow neural networks, support vector machines, and so on) may be uploaded to at least a portion of the vehicles. The vehicles may obtain sensor information (e.g., images, video) during normal operation and the classifiers may be configured to identify specific features or objects represented in the sensor information. Prior to being provided to the vehicles, these classifiers may be trained to classify images as including specific image features or objects. For example, a limited number of examples of the specific image features or objects (e.g., one hundred, one thousand, and so on) may be used to train these classifiers. As will be described, the classifiers may then classify sensor data using information from an intermediate layer of a machine learning model executing on the vehicles. An example machine learning model may include a convolutional network. The example machine learning model may be used, at least in part, for the above-described automated driving features. Thus, the classifiers may leverage the existent example machine learning model.

A multitude of these classifiers may be uploaded to a computer system within a vehicle, such that the classifier may be used to recognize specific image features or objects associated with the classifiers. The captured images that are designated by the classifier as including the particular feature or object can then be transmitted to a central server system and used as training data for neural network systems. Since the classifiers may leverage existing machine learning models already being executed by the vehicles in typical operation, the classifiers may be efficient in terms of processing requirements. Additionally, there may be a large number of vehicles being driven in disparate environments, which increases the likelihood of obtaining examples of hard to find 'edge cases' of certain features. In this way, the entity may rapidly obtain sensor information (e.g., images) which represent specific image features or objects of interest to the entity.

In this specification, an object or feature to be learned may represent any real-world object, scenario, feature, and so on, which can be captured in sensor data. Example objects or features may include a tire in a road, a tunnel exit, a bike, a tree with branches extending into the road, a scene in which vehicles are oriented in a particular way or performing a particular action or maneuver, and so on. Furthermore, reference herein is made to identifying training data for a use case or purpose. An example use case or purpose may include identifying one or more objects, features, and so on. Additionally, while this specification describes vehicles obtaining sensor information, such as images, it may be understood that the features described herein may be broadly applicable. For example, classifiers may be provided to user devices (e.g., smart phones) and used to recognize particular image features or objects. As another example, classifiers may be used in airplanes, unmanned aerial vehicles, unmanned vehicles, and so on.

Generation of Training Data

A neural network training technique for identifying additional training data relevant to particular use cases is disclosed. By identifying and collecting additional training data, particularly data for difficult to correctly analyze use cases, a deep learning system can be re-trained to improve its performance. For example, a difficult use case can be identified and data can be collected based on the use case. A new machine learning model can then be trained with the newly collected data that outperforms the old model. In various embodiments, the existing machine learning model is utilized with a trigger classifier to identify relevant training data. The relevant training data is then transmitted back for processing to create new training data. In some embodiments, an initial data set representative of the targeted use case is created and used to create a trigger classifier.

For example, a deep learning system for autonomous driving may have difficulty analyzing and identifying a tunnel exit. A training data set is created with positive and negative examples of a tunnel exit. In some embodiments, the trigger classifier is trained on an initial training data set using an intermediate output of a layer of the existing machine learning model. In some embodiments, the layer is the intermediate layer. For example, data from the training set is fed to an existing machine learning model and the output of the second to last layer of the model is used as input to train a trigger classifier. In some embodiments, the trigger classifier is a support vector machine that is trained offline from the deployed deep learning application. Once trained, the trigger classifier may be installed or deployed to run alongside a deep learning system that is already in use within an autonomous driving system of a vehicle. For example, the trigger classifier may be deployed through a wireless network that downloads and installs the trigger classifier in the vehicle. The trigger classifier is applied to the intermediate output of the same layer of the deployed deep learning system to determine a classifier score. In some embodiments, the input to the trigger classifier is the intermediate output of a layer of a convolution neural network (CNN) applied to sensor data captured by an autonomous vehicle, for example image data captured by cameras on the vehicle.

In some embodiments, the trigger classifier, implemented using a single support vector machine, a small neural network, or another appropriate classifier, may be applied on the whole captured image and/or to specific locations of the image. For example, the trigger classifier can be applied at every single location of an image or a subset of locations. The trigger classifier can be applied to effectively scan across the features of the neural network spatially to identify small parts such as shopping carts, animals, etc. Once applied, the trigger classifier determines a classifier score and depending on the score, the sensor data is identified and retained as potentially useful training data. As one example, the trigger classifier scores sensor data from a camera based on how likely the data represents a tunnel exit. Sensor data that scores high and likely represents a tunnel exit is retained and flagged to be used as training data. In some embodiments, trigger properties such as filters are applied to the trigger classifier to determine the conditions that must be met to proceed with determining a classifier score, the circumstances under which the classifier score exceeds a threshold, and/or the conditions necessary to retain the sensor data. For example, in some embodiments, sensor data is scored and collected at most once every interval, such as no more than once every 30 minutes. In some embodiments, the classifier score must exceed a threshold for the sensor data to be collected and retained. In the event the sensor data meets the configured threshold, the sensor data is retained and used as potential new training data. In one embodiment, the sensor data is wirelessly uploaded to a server that is managing the training data system.

In some embodiments, additional metadata is collected and retained along with the sensor data such as the location, the road type, the model of vehicle, whether the vehicle is left-hand drive or right-hand drive, the time of day, the classifier score, the length of time since the last transmitted sensor data, and/or vehicle control parameters/operating conditions such as speed, acceleration, steering, braking, steering angle, etc. In various embodiments, the data and metadata are transmitted to a computer data server where it is used for creating a new training data set to improve the application of the deep learning system for the particular use case. For example, retained sensor data associated with identified tunnel exits is identified by the trigger classifier and used to create additional training data for identifying tunnel exits.

In some embodiments, after uploading the sensor data is reviewed and annotated to create a new training data set that is used to improve the autonomous driving features of the vehicle. For example, the data may be annotated as positive samples of tunnel exits and may be used to supplement an original training data set that includes many more use cases. A new machine learning model is trained using the newly curated data set to improve the autonomous vehicle neural network, and is then deployed to vehicles as an update to the autonomous vehicle system. The newly deployed machine learning model has an improved ability to detect the particular use case (for example, tunnel exit) targeted by the trigger classifier. As one example, the improved model will have improved accuracy and performance in identifying tunnel exits. Additional examples of use cases include trigger classifiers trained for identifying particular objects (e.g., shopping carts, animals, etc.), road conditions, weather, driving patterns, hazards, etc.

In various embodiments, the trigger classifier can be developed and deployed to a fleet of vehicles without updating the core software for a vehicle, such as components of a deep learning system used for autonomous driving. New and updated trigger classifiers that link into and are associated with the vehicle's existing neural network software can be pushed to vehicles much more frequently and with little to no impact to the core vehicle functionality such as driving, safety systems, and navigation, among others. For example, a trigger classifier can be trained to identify cobblestone roads, be deployed to a fleet of vehicles, and begin to gather image and related data of cobblestone roads within minutes. Using the disclosed techniques, the speed to gather relevant training data for specific use cases is vastly improved with little to no impact on ongoing vehicle operation or on the driver or passengers of the vehicle. New trigger classifiers can be deployed without a long and laborious installation process. The process can be performed remotely and dynamically, for example, using an over-the-air update, without requiring the vehicle be brought to a service location. After such an update, the trigger classifier may begin scanning captured images for any that meet the trigger conditions, and then upload images which meet those conditions as future training data objects.

In some embodiments, sensor data is transmitted and received by different devices. For example, a vehicle equipped with autonomous driving technology, including sensors for gathering information related to its surroundings, receives sensor data from its sensors. In some embodiments, the vehicle is equipped with sensors such as cameras, ultrasonic sensors, radar sensors, LiDAR, and/or other appropriate sensors, to capture data related to autonomous driving. In some embodiments, a neural network is applied to the sensor data. For example, a convolutional neural network (CNN) is applied to the received sensor data, such as an image of the road in front of the vehicle. The CNN may be used to identify objects in the captured sensor data and the result of applying the neural network is used for controlling the vehicle. As an example, road lane lines are identified and used to maintain the vehicle between the identified lane lines.

In some embodiments, a trigger classifier is applied to an intermediate output of the neural network to determine a classifier score for the sensor data. For example, the intermediate output of a layer is fed into a trigger classifier, which determines a classifier score for the sensor data. In some embodiments, the neural network includes multiple intermediate layers and the particular intermediate output (and corresponding layer) from which to receive the input into the trigger classifier is configurable. For example, the trigger classifier can be configured to receive the output of the layer that is the second to last, the third to last, the fourth to last, etc. In some embodiments, the intermediate output is the output from any of the intermediate layers of the neural network. In some embodiments, the intermediate output may be the output of the first layer of the neural network. In some embodiments, a determination is made whether to transmit via a computer network at least a portion of the sensor data based at least in part on the classifier score. For example, a determination is made based on whether the classifier score exceeds a threshold required to retain the sensor data and transmit the data for further use. In some embodiments, the determination is made based on the classifier score and whether additional trigger classifier conditions are met. Examples of required conditions may be used to filter the captured sensor data based on the location of the vehicle, the amount of time the vehicle has been driving, the type of vehicle, whether an autonomous driving feature was recently disengaged, etc. In various embodiments, sensor data that meets the required conditions and score threshold is transmitted via a computer network, such as a WiFi or cellular network, to a computer server for further processing. In some embodiments, the data is processed to create a new or additional training data set. In various embodiments, the training data includes both training and validation data.

Example Block Diagrams

FIG. 1A is a schematic diagram illustrating a vehicle traveling along a road and gathering training data from its surroundings. In the example block diagram, a vehicle 102 is driving about a road. The vehicle 102 may include sensors, such as cameras, radar, and so on, such that the sensors capture information regarding a sensor volume 104 about the vehicle 102. An example sensor 107 is illustrated in FIG. 1A. For example, the vehicle 102 may obtain images of the surroundings of the vehicle 102. These obtained images may then be analyzed in an effort to understand the surroundings. For example, the images may be analyzed to classify objects represented in the images. In this example, the images may be analyzed to identify other vehicles, road markings, trees or other vegetation, obstacles in the road, pedestrians, signs, and so on. As will be described in more detail below, the vehicle 102 may leverage machine learning techniques to analyze the sensor information. For example, one or more convolutional neural networks may be used to classify objects included in the example sensor volume 104. Example description of a deep learning system 700 which may be used by the vehicle 102 is included below, with respect to FIG. 1B and FIG. 7.

While the above-described machine learning techniques may be used to analyze sensor information, it is to be appreciated that certain real-world objects or scenarios may be difficult for the vehicle 102 to accurately understand or classify. For example, a tire 106 is shown positioned on the road on which the vehicle 102 is driving. Being able to recognizing this tire 106 may be enhance safety and performance of the vehicle 102. As an example, the vehicle 102 may perform automated driving techniques to navigate around the tire 106 if the tire 106 is in the path of the vehicle 102. Additionally, even if the tire is not in the path of the vehicle 102, recognizing the tire 102 may still affect automated driving of the vehicle 102. For example, other vehicles may suddenly veer into the vehicle's 102 lane to avoid the tire 106. In this example, being able to identify the tire 106 may thus inform future predicted movements of the vehicle 102 (e.g., preemptively slowing down as another vehicle approaches the tire 106).

Thus, it may be beneficial for the vehicle 102 to accurately identify the tire 106 as being included in the sensor volume 104. However, and as described above, being able to identify the tire 106 may require substantial training data. The training data may include images of multitudes of tires of all configurations which are on various roads. The training data may be enhanced by the inclusion of images of different tires on different roads. Additionally, the training data may be enhanced by images of different tires on different roads in different driving environments. For example, it may be advantageous to have images of tires partially included in snow on different roads. As another example, it may be advantageous to have images of deflated tires included in dusty roads. Acquiring access to such images may present great technical challenges.

As will be described, one or more classifiers may be trained to recognize tires. For example, the classifiers may be trained using a limited set of training examples. These classifiers may then be provided to the vehicle 102 via an over the air (OTA) update. For example, the OTA update may be received wirelessly via the vehicle 102 (e.g., over Wi-Fi, via cellular signals such as LTE networks, and so on). A classifier may then analyze sensor information obtained the vehicle 102. If the classifier detects that a tire is depicted in the sensor information (e.g., an image), the vehicle 102 may transmit the sensor information to an outside system for processing. This outside system may aggregate such received sensor information to create training data sets of tires. As will be described, these training data sets may then be used to train complex machine learning models executing on the vehicle 102 (e.g., convolutional neural networks). In this way, the machine learning models, and thus the ability of the vehicle 102 to perform automated driving tasks, may be enhanced.

Figure 1B:
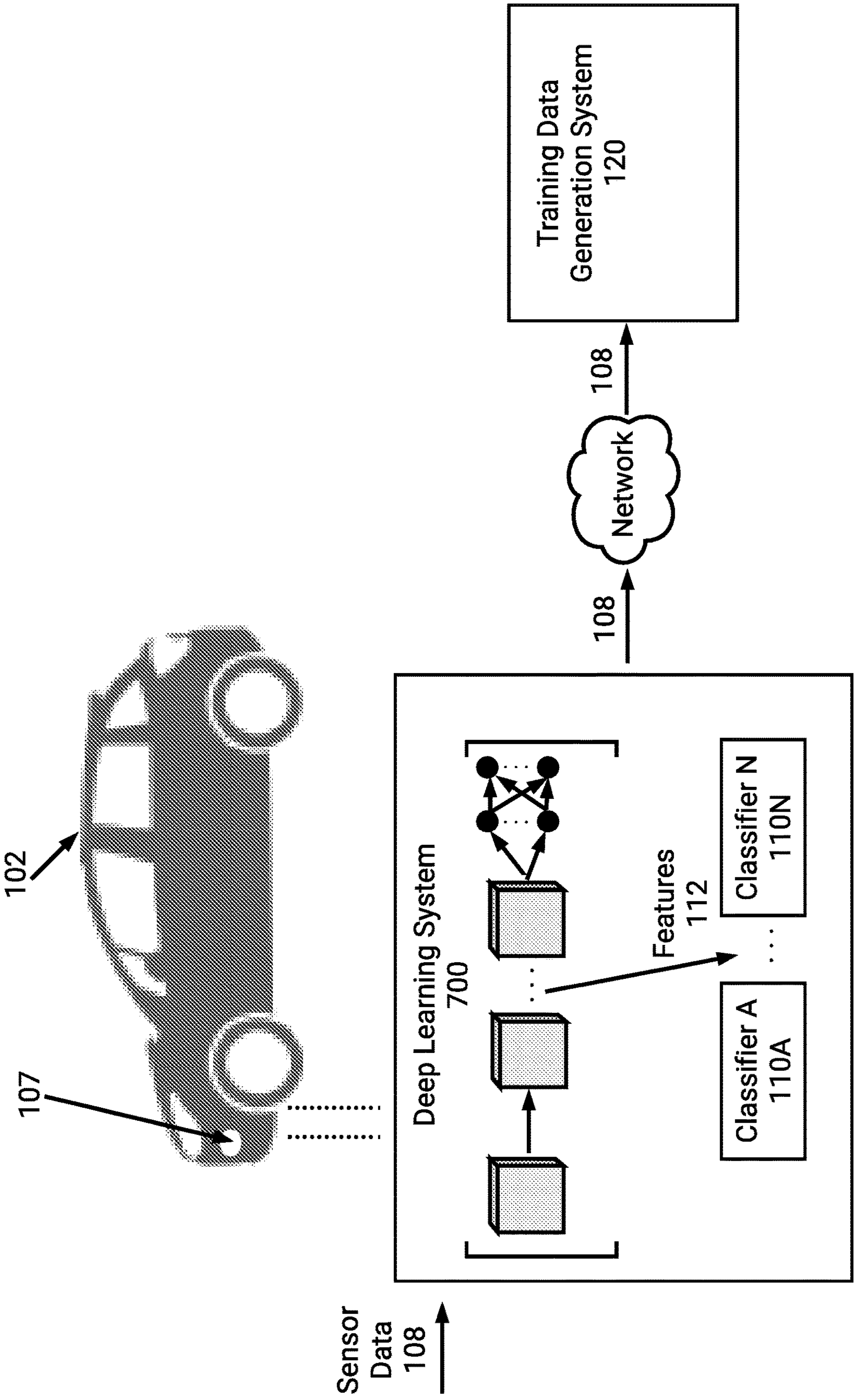
FIG. 1B is a block diagram illustrating one embodiment of a system for generating training data.

FIG. 1B is a block diagram illustrating generation of training data. In this illustration, sensor data 108 is being received by the vehicle 102. The sensor data 108 may include one or more images or video which depict the tire 106 illustrated in FIG. 1. This sensor data 108 may be provided to a deep learning system 700 of one or more processors, which is included in the vehicle 102. An example of aspects of the deep learning system 700 is illustrated in FIG. 1B.

As illustrated, the deep learning system 700 may use example machine learning techniques, such as a convolutional neural network, to analyze the received sensor data 108. As described in FIG. 2, the sensor data 108 may be pre-processed (e.g., normalized, passed through a filter, and so on). It may be appreciated that a convolutional neural network may include a multitude of convolutional layers. These convolutional layers may apply convolutional filters such that output volumes are created. In some embodiments, one or more fully-connected or dense layers may be used as final layers to classify features or objects included in the sensor data 108. As an example, one or more softmax layers or independent logistic classifiers may be used to classify the features or objects. In this way, the deep learning system 700 may identify real-world objects, scenarios, and so on, which are included in the sensor volume 104 surrounding the vehicle 102. Based on identifying these real-world objects, scenarios, and so on, the vehicle 102 may perform automated driving tasks. Thus, the vehicle 102 may implement the convolutional neural network in its typical operation.

The deep learning system 700 includes one or more classifiers. For example, classifiers A-N 110A-110N are illustrated in FIG. 1B. These classifiers 110A-110N may have been received via OTA updates to the vehicle 102 (e.g., periodic updates provided to the vehicle). Prior to receiving the classifiers 110A-110N, an entity may have trained them to identify respective features or objects as represented in sensor data. For example, classifier A 110A may have been trained to identify a snowy scene. As another example, classifier N 11ON may have been trained to identify tires, bikes on a road, and so on. The entity may have trained the classifiers 110A-110N using limited training data. For example, classifier N 110N may have been trained using 100, 500, 1000, examples of tires on a road or a specific type of tire on a specific type of road.

As illustrated, the classifiers 110A-110N may use information obtained from an intermediate layer of an example machine learning model (e.g., convolutional neural network). For example, features 112 may be obtained from an intermediate layer of the convolutional neural network. Since the convolutional neural network may be trained to classify or otherwise identify features or objects in sensor data, the classifiers may leverage this existing ability. As an example, the convolutional neural network may learn to apply convolutional filters to learn features indicative of real-world objects. The convolutional neural network may then classify features as corresponding to specific categories or classes of real-world objects.

When training the classifiers 110A-110N, they may therefore be trained using information obtained from an intermediate layer of the convolutional neural network. For example, classifier 110N may be trained using a limited training data set of images depicting tires. In this example, the images may be provided to the example convolutional neural network. At a particular intermediate layer of the convolutional neural network, features 112 may be provided to classifier 110N. The classifier 110N may then be trained to assign a high classifier score for an image depicting a tire. The classifier 110N may optionally be trained to assign a low classifier score for an image which does not depict a tire. In this way, the classifier 110N may leverage the convolutional neural network, which as described above may be used in typical operation of the vehicle 102.

As illustrated in FIG. 1B, the classifiers 110A-110N are receiving features 112 from an intermediate layer of the convolutional neural network. Optionally, the classifiers 110A-110N may use features from different intermediate layers. For example, classifier N 110N may use features from a first layer (e.g., layer 4, 5, and so on) while classifier A 110N may use features from a second layer (e.g., 6, 7, and so on). During training, a specific layer from which to receive features may be identified for each classifier. For example, the specific layer may be identified based on an accuracy of the corresponding training classifier with respect to a validation data set.

With respect to the tire 106 illustrated in FIG. 1A, one of the classifiers 110A-110N may be trained to identify tires. For example, classifier N 110N may be trained to identify tires. In this example, classifier N 110N may assign a classifier score to the sensor data 108. In the illustrated example, classifier N 110N has assigned a classifier score greater than a threshold (e.g., 0.5, 0.7, and so on). The vehicle 102 may therefore transmit the sensor data 108 to an outside system (e.g., a training data generation system 120). For example, the vehicle may transmit the sensor data 108 over a network (e.g., the internet) via Wi-Fi, cellular service, and so on.

Thus, the outside system 120 may receive sensor data 108 from a multitude of vehicles. For example, the outside system 120 may receive images depicting tires from vehicles which, in their normal course of operation, may happen to pass proximate to tires. Advantageously, these tires may be of different types, may be deflated or in states of decay, may be represented in different road conditions, may be partially occluded, and so on. The classifiers 110A-110N may, as an example, use classifier scores which cause transmission of a multitude of sensor data 108 to the outside system 120. For example, a portion of images transmitted to the system 120 may not include tires. In some embodiments, the entity may thus rapidly review and discard certain of the images. The remaining images may be aggregated into large training data sets and used to update the machine learning models executing on the vehicle. For example, the convolutional neural network may be trained to identify tires. Optionally, bounding boxes or other label information may be assigned to images included in the aggregated training data sets.

In some embodiments, the vehicle 102 may have a greater number of classifiers than is currently being executed by the vehicle 102. For example, the vehicle 102 may have 50, 75, 100, classifiers. However, during operation of the vehicle 102, the vehicle 102 may execute 20, 30, 40 or more of the classifiers. For example, the vehicle 102 may determine respective classifier scores for a subset of the total classifiers stored by the vehicle 102. Optionally, each classifier may execute for a particular period of time before being swapped for another classifier.

Additionally, the vehicle 102 may execute certain classifiers depending on one or more triggers. As an example, the vehicle 102 may receive information identifying locations, or approximate locations, which are known to have certain real-world objects, features, or exhibit certain scenarios. For example, the vehicle 102 may access map information identifying that a tunnel exit is in a certain area. In this example, the vehicle 102 may ensure that a classifier associated with identifying tunnel exits is executing at a time when the vehicle 102 is proximate to the tunnel it.

As another example, the outside system 120 may optionally receive location information along with received sensor data. Thus, the outside system 120 may identify that a threshold number of vehicles have transmitted sensor data based on a same classifier for a particular real-world area. As an example, the outside system 120 may identify that a particular on-ramp has an obstruction in the road. As another example, the outside system 120 may identify that a particular on-ramp has a certain type of obstruction in the road. The system 120 may then transmit information to a portion of vehicles to execute the same classifier when proximate to the particular real-world area. In this way, the system 120 may ensure that it is able to obtain a greater quantity of training data based on this same sensor.

Furthermore, the system 120 may instruct vehicles to transmit sensor data even if the above-described classifier does not assign a classifier score greater than a threshold. As an example, the system 120 may receive sensor data from a threshold number of vehicles proximate to a real-world location. In this example, the system 120 may instruct any vehicle within a threshold distance of that real-world location to transmit sensor data (e.g., images) even if their classifiers do not generate a classifier score greater than a threshold. Since the classifier may be trained on a training set with a limited number of examples (e.g., 100, 1000, as described above), depending on the angle of a particular vehicle with respect to an object, the particular vehicle's classifier may not identify the object. However, the sensor data may be useful to the generation of a robust training set for the object. For example, the object may be partially visible in images obtained by the particular vehicle and therefore may be useful in a large training set to identify the object. In this way, the outside system 120 may override the classifier and cause the particular vehicle to transmit sensor data.

In all situations in which the outside system 120 receives location information, or any identifying information, it should be understood that the information may be anonymized. Additionally, such techniques may require affirmative user consent (e.g., opt-in).

Example Flow Diagrams

Figure 2:
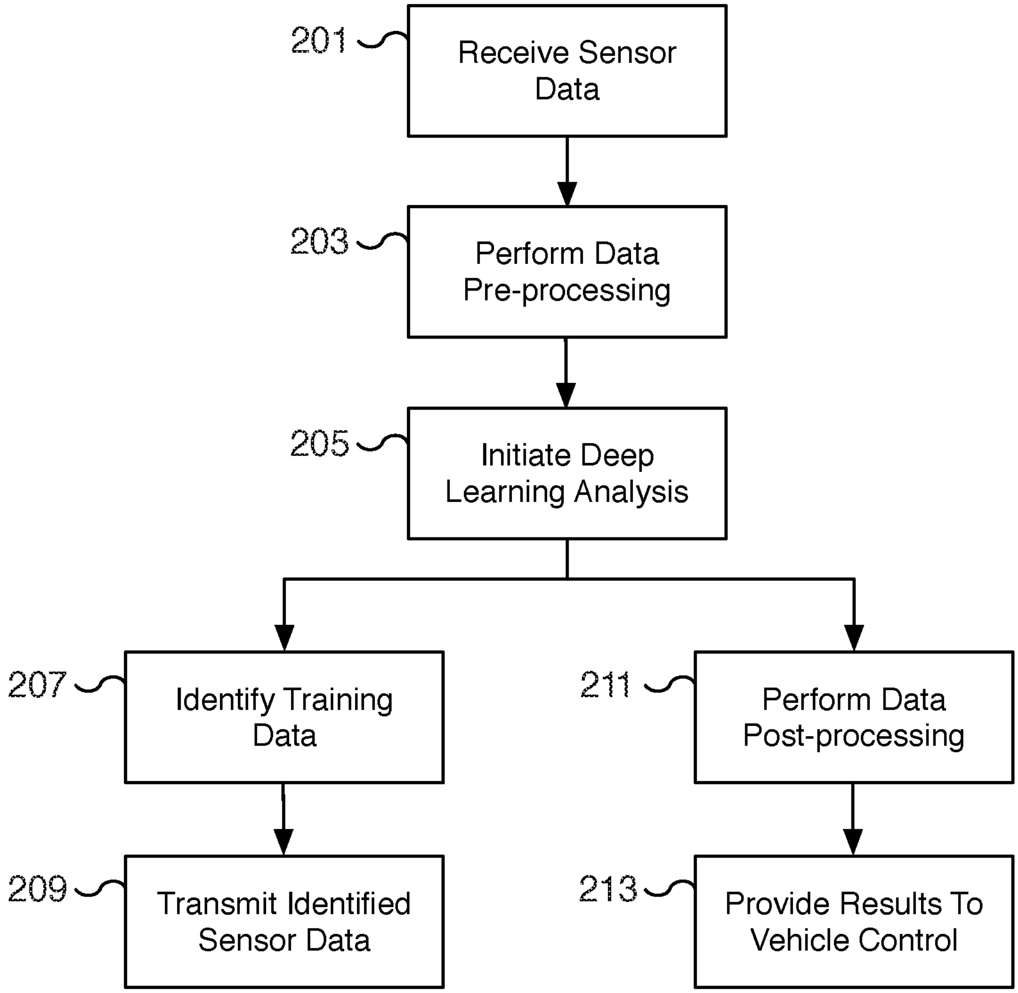
FIG. 2 is a flow diagram illustrating an embodiment of a process for applying a trigger classifier to the intermediate result of a machine learning model.

FIG. 2 is a flow diagram illustrating an embodiment of a process for applying a trigger classifier to the intermediate result of a machine learning model. In some embodiments, the process of FIG. 2 is utilized to collect and retain sensor data captured by sensors for a machine learning model for autonomous driving and that meets a particular use case. For example, the particular use case may be associated with identification of certain features, objects, scenarios, and so on. In some embodiments, the process of FIG. 2 is implemented on a vehicle enabled with autonomous driving whether the autonomous driving control is enabled or not. For example, sensor data can be collected in the moments immediately after autonomous driving is disengaged or while a vehicle is being driven by a human driver. In some embodiments, the techniques described by FIG. 2 can be applied to other deep learning systems outside the context of autonomous driving to improve the training data set, particularly for difficult to analyze use cases. In various embodiments, the trigger classifier has been trained using the intermediate output of a layer of the machine learning and training data designed for the use case.

In some embodiments, multiple triggers and/or multiple classifiers may be used together to identify sensor data for multiple use cases. For example, one trigger may be used to identify tunnels, another for manholes, another for forks in a road, etc. In some embodiments, the functional components of a trigger classifier for determining a classifier score and/or applying required conditions are shared between different triggers. In some embodiments, each trigger is specified using a weighted vector, an optional bias, and one or more threshold metrics to compare the classifier score with. In some embodiments, additional required conditions such as the time of day, the vehicle location, the road type, etc. are specified for a particular trigger. For example, a trigger may require that sensor data of a tunnel be captured only at dawn and dusk. As another example and useful to reduce duplicative data, a trigger may require that sensor data be captured at most every 30 minutes and only after the vehicle has been driven for at least 20 minutes. In various embodiments, the trigger threshold(s) and required conditions are properties specified for the trigger classifier.

At 201, sensor data is received. For example, a vehicle equipped with sensors captures sensor data and provides the sensor data to a neural network running on the vehicle. In some embodiments, the sensor data may be vision data, ultrasonic data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and/or radar sensors are used to capture surrounding details. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles. The various sensors are used to capture the environment surrounding the vehicle and the captured image is provided for deep learning analysis.

At 203, the sensor data is pre-processed. In some embodiments, one or more pre-processing passes may be performed on the sensor data. For example, the data may be pre-processed to remove noise, to correct for alignment issues and/or blurring, etc. In some embodiments, one or more different filtering passes are performed on the data. For example, a high-pass filter may be performed on the data and a low-pass filter may be performed on the data to separate out different components of the sensor data. In various embodiments, the pre-processing step performed at 203 is optional and/or may be incorporated into the neural network.

At 205, deep learning analysis of the sensor data is initiated. In some embodiments, the deep learning analysis is performed on the sensor data optionally pre-processed at 203. In various embodiments, the deep learning analysis is performed using a neural network such as a convolutional neural network (CNN). In various embodiments, the machine learning model is trained offline and installed onto the vehicle for performing inference on the sensor data. For example, the model may be trained to identify road lane lines, obstacles, pedestrians, moving vehicles, parked vehicles, drivable space, etc., as appropriate. In various embodiments, the neural network includes multiple layers including one or more intermediate layers.

At 207, potential training data is identified. For example, sensor data that may be used for training the machine learning model is identified from the sensor data analyzed using the deep learning analysis. In some embodiments, the identified training data is data associated with a particular use case. For example, possible use cases may involve identifying: a curved road, an on ramp, an off ramp, the entrance to a tunnel, the exit of a tunnel, an obstacle in the road, a fork in the road, road lane lines or markers, drivable space, road signage, contents of signs (e.g., words, numbers, symbols, etc.), and/or other features as appropriate for autonomous driving. In various embodiments, the use case depicted in the sensor data is identified by using the intermediate output of a layer of the neural network used for deep learning analysis and a trigger classifier. For example, a trigger classifier determines a classifier score using the output of an intermediate layer of a neural network. A classifier score that exceeds a threshold and passes the required conditions specified along with the trigger is identified as potential training data. In various embodiments, the threshold is utilized to identify positive examples of the use case. For example a higher classified score indicates a higher likelihood the sensor data is representative of the use case. In some embodiments, the classifier score is a number between negative one and positive one. A score closer to positive one is more likely to be representative of the targeted use case. In various embodiments, conditions specified by additional filters such as time of day, vehicle type, location, etc. are used to identify sensor data for the targeted use case.

At 209, the identified sensor data is transmitted. For example, the sensor data identified at 207 is transmitted to a computer server for additional processing. In some embodiments, the additional processing includes creating a training set using the identified sensor data. In various embodiments, the sensor data is transmitted wirelessly, for example, via a WiFi or cellular connection, from a vehicle to a data center. In some embodiments, metadata is transmitted along with the sensor data. For example, metadata may include the classifier score, the time of day, a timestamp, the location, the type of vehicle, vehicle control and/or operating parameters such as speed, acceleration, braking, whether autonomous driving was enabled, steering angle, etc. Additional metadata includes the time since the last previous sensor data was transmitted, the vehicle type, weather conditions, road conditions, etc.

At 211, post-processing of the data is performed. In some embodiments, different post-processing techniques are utilized to enhance the quality and/or to reduce the amount of data required to represent the data. In some embodiments, the output of the deep learning analysis is merged with the result of deep learning applied to other sensors. In some embodiments, the post-processing is used to smooth out the analysis performed on different sensor data. The processed data may be used for controlling the vehicle. Additional information related to the data may also be processed at 211. For example, information such as the configuration of the autonomous driving system, including what autonomous driving features are enabled, may be combined with the deep learning analysis. Other information may include the vehicle operating and/or control parameters and/or environmental data such as a map, topography, and/or GPS data. In some embodiments, the post-processing may include combining the result of deep learning analysis performed on data from other sensors to create a unified representation of the vehicle's surrounding environment. In some embodiments, the post-processing step at 211 is an optional step.

At 213, the results of the deep learning analysis are provided to vehicle control. For example, the results are used by a vehicle control module to control the vehicle for autonomous driving. In some embodiments, the vehicle control can modulate the speed and/or steering of the vehicle. In various embodiments, the vehicle control may be disabled but the intermediate results of the deep learning analysis at 205 are utilized for identifying training data at 207 and transmitting the identified sensor data at 209. In this manner, the deep learning analysis can be utilized to identify and retain suitable training data even when the vehicle is not under the control of the autonomous driving system. In various embodiments, sensor data is identified and retained when the autonomous driving system is active.

Figure 3:
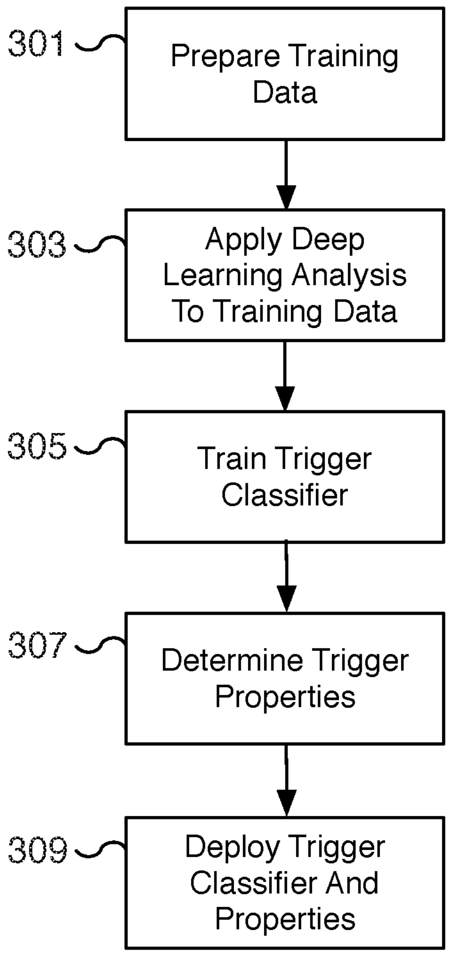
FIG. 3 is a flow diagram illustrating an embodiment of a process for creating a trigger classifier using the intermediate result of a machine learning model.

FIG. 3 is a flow diagram illustrating an embodiment of a process for creating a trigger classifier using the intermediate result of a machine learning model. In some embodiments, the process of FIG. 3 is utilized to train a trigger classifier for identifying and retaining relevant sensor data for a particular use case. For example, sensor data processed by a deep learning system during its regular use includes a subset of data that is useful as training data. The trigger classifier can be trained to identify use cases such as tunnel entrances, tunnel exits, forks in the road, a curved road, on ramps, and other appropriate features useful for autonomous driving using the intermediate results of a deep learning system for autonomous driving. By utilizing the intermediate results of a deep learning system with the trigger classifier, the efficiency of the identification and collection is greatly improved. In various embodiments, the trained trigger classifier is installed along with trigger properties on a deployed deep learning system to collect and retain potential training data for relevant use cases. In some embodiments, the trigger classifier is a support vector machine although other appropriate classifiers may be used. For example, in some embodiments, the trigger classifier is a neural network and may include one or more intermediate layers. In some embodiments, the deployed deep learning system utilizes the process of FIG. 2.

At 301, training data is prepared. For example, positive and negative examples of a particular use case are prepared as training data. As one example, positive and negative examples of a tunnel exit are collected and annotated. The curated and annotated data set is used to create a training set. In some embodiments, the annotating includes labeling the data and may be performed by a human curator. In some embodiments, the format of the data is compatible with a machine learning model used on a deployed deep learning application. In various embodiments, the training data includes validation data for testing the accuracy of the trained model.

At 303, deep learning analysis is applied to the training data. For example, an existing machine learning model is used to initiate a deep learning process. In some embodiments, the deep learning model is a neural network such as a convolutional neural network (CNN) with multiple layers. In some embodiments, the CNN may include three or more intermediate layers. Examples of the deep learning analysis include a neural network for autonomous driving. In various embodiments, the deep learning analysis is initiated by feeding the training data prepared at 301 to a neural network to produce the intermediate layer results.

At 305, a trigger classifier is trained. In some embodiments, a trigger classifier is a support vector machine or small neural network. In various embodiments, the input to the trigger classifier is the output of the first or an intermediate layer of a machine learning model of the deep learning system. The particular layer utilized for the input may be configurable. For example, the output of the second to last layer, the third to last layer, the fourth to last layer, and so forth, up to the first layer may be utilized as input for training the trigger classifier. In various embodiments, the annotated results of the training data are used with the raw data (such as image data) for training the trigger classifier. By using positive and negative examples, the trigger classifier is trained to identify the likelihood an input (for example, an input from sensor data) is a match for the particular use case, such as a tunnel exit. In some embodiments, the results of the trained trigger classifier are validated using a validation data set created at 301. In some embodiments, the trigger classifier is trained using an offline neural network that matches the neural network deployed on a vehicle.

In some embodiments, an output of a neural network output is a feature vector that identifies features of the input data (such as a raw image). Features may include the number of vehicles, the number of signs, the number of lanes, etc., in the raw data. The intermediate outputs of the layers, e.g., the layers processed ahead of the final layer, include semantic information of the raw input data. In some embodiments, the intermediate output of the layer may be represented in vector form and the vector has more elements than the vector output of the final layer. For example, a final output of a neural network may be a 32-element vector while the output of the second to last layer may be a 64-element vector. In various embodiments, the output of first and intermediate layers of the neural network (such as, for example, a 64-element vector) includes a greater amount of semantic information associated with the raw input data than the output of the final layer of the neural network (such as, for example, a 32-element vector) and is thus used for training the trigger classifier. In some embodiments, the particular layer chosen for training the trigger classifier may be selected dynamically. For example, a particular intermediate layer (such as an earlier layer) may be selected based on an improvement in the accuracy of that particular layer compared to another layer (such as a layer closer to the final layer). In some embodiments, the particular layer is chosen based on the efficiency in utilizing the layer. For example a layer with a smaller output vector may be chosen in the event the results using the layer meet accuracy demands.

In some embodiments, the input from different intermediate layers is used to train more than one trigger classifier and the different trained classifiers are compared to one another. A balance between accuracy and performance is used to determine which of the multiple classifiers to use.

For example, the output of an earlier intermediate layer is necessary for some use cases while the output of a later intermediate layer is sufficient for other use cases. The output of the optimal intermediate layer may be determined by comparing multiple trained trigger classifiers. In various embodiments, which layer of the neural network from which to receive an intermediate result is dynamically selected as part of the trigger classifier training process.

In some embodiments, the trained classifier may be specified by a vector and a bias factor. For example, the trained classifier may be a vector of weights that are offset by a bias factor to determine a classifier score. In some embodiments, the number of elements of the vector is the same as the number of elements of the output of the intermediate layer used and the number of elements of the input for training the classifier. For example, in the event the output of the intermediate layer used to train the classifier is 1024 elements, the input data used to train the trigger classifier is 1024 elements and the resulting trigger classifier can be represented as a 1024 weighted vector and a bias. In some embodiments, the bias is optional and may be taken into account by the elements of the weighted vector.

At 307, trigger properties for the classifier trained at 305 are determined. For example, a threshold may be determined that is compared to the classifier score determined by the trained trigger classifier. For example, a classifier score that exceeds the threshold indicates the raw input associated with the score is likely to be a positive example of the target use case. For example, a trigger classifier trained to identify tunnel exits determines a classifier score. Using a threshold of 0.5, a classifier score of 0.7 indicates the data is likely representative of a tunnel exit. In some embodiments, a score of −1.0 is a negative example and a score of 1.0 is a positive example. Classifier scores lie between −1.0 and 1.0 to indicate how likely the raw input is a positive or negative example of the targeted use case.

In some embodiments, the trigger properties include required conditions such as trigger filters. Trigger filters are filters used to restrict the retention of sensor data to the described conditions. For example, the sensor data may be triggered for retention based on the location associated with the data. Other examples include the length of time since the last sensor data triggered and positive identification, the length of time since the drive started, the time of day, the location, the road type, etc. In various embodiments, one or more trigger properties can be specified to limit the conditions under which the trigger classifier is used to collect and retain sensor data.

At 309, the trigger classifier and trigger properties are deployed. For example, the trigger classifier and properties used to trigger the classifier for retaining sensor data are installed alongside a deep learning system. For example, the trigger classifier and properties may be packaged as a small binary that is transmitted wirelessly to a vehicle. In some embodiments, the packaged trigger classifier and properties are transmitted as an over-the-air update using wireless technology such as a WiFi or cellular network connection. Once received at the vehicle, the trigger classifier and properties are installed as part of the autonomous driving system. In some embodiments, only the trigger classifier is installed. In some embodiments, the trigger classifier and the deep learning model for autonomous driving are installed together. In various embodiments, the machine learning model of the autonomous driving system matches the one used to train the trigger classifier.

Figure 4:
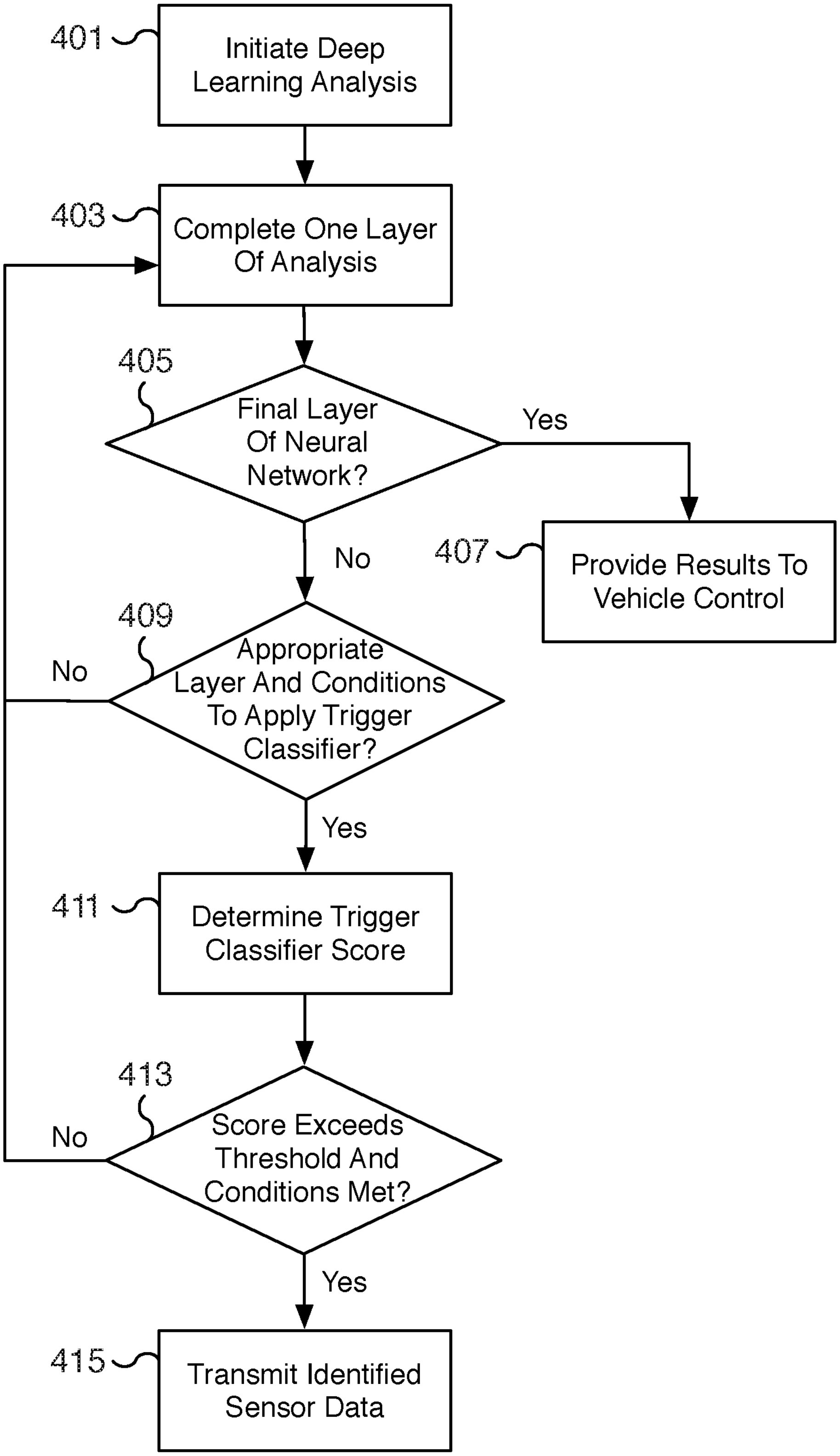
FIG. 4 is a flow diagram illustrating an embodiment of a process for identifying potential training data using a trigger classifier and transmitting sensor data.

FIG. 4 is a flow diagram illustrating an embodiment of a process for identifying potential training data using a trigger classifier. In some embodiments, the trigger classifier is run in conjunction with a deep learning system. For example, a deep learning system using a machine learning model that matches the one used to train the trigger classifier is utilized with a trigger classifier as part of an autonomous driving system. The trigger classifier analyzes sensor data at least partially analyzed by the deep learning system to identify whether the sensor data meets particular use cases that warrant retaining the sensor data. The sensor data is then transmitted to a computer server and may be used to create training data for a revised machine learning model with improved performance in identifying the particular use case. Examples of the use cases include identifying an on ramp, a tunnel exit, an obstacle in the road, a fork in the road, specific types of vehicles, etc. In some embodiments, trigger parameters are used to configure the conditions under which the trigger classifier identifies a relevant result. In some embodiments, one or more trigger classifiers and parameters are used to identify one or more different use cases. In some embodiments, the process of FIG. 4 is performed at 205, 207, 209, 211, and/or 213 of FIG. 2. In some embodiments, the trigger classifier used in the process of FIG. 4 is trained using the process of FIG. 3.

At 401, a deep learning analysis is initiated. For example, a deep learning analysis of an autonomous driving system is initiated with sensor data captured by sensors attached to a vehicle. In some embodiments, the initiated deep learning analysis includes pre-processing the sensor data. In various embodiments, the deep learning analysis utilizes a trained machine learning model with multiple layers including one or more intermediate layers. In some embodiments, the output of the first layer and any intermediate layer is considered an intermediate output. In various embodiments, an intermediate output is the output of a layer of a machine learning model other than the final output (e.g., the output of the final layer of the model).

At 403, inference using one layer of the deep learning analysis is completed. For example, a neural network includes multiple layers including intermediate layers followed by a final layer. The output of each layer (e.g., an intermediate result) is fed as input to the next layer. In some embodiments, the output of the first layer and each intermediate layer is considered an intermediate result. In various embodiments, the result of determining the output of a single layer is a vector that may be used as an input to the next layer. In some embodiments, the input to the first layer of a neural network is sensor data such as image data. In some embodiments, the neural network is a convolutional neural network.

At 405, a determination is made whether the output of the layer analysis performed at 403 is a result of the final layer of the neural network. In the event the output is not the result of the final layer, for example, the output is an intermediate result, processing continues to 409. In the event the output is the result of the final layer of the neural network, inference performed using the machine learning model is complete and processing continues to 407. In some embodiments, the output at 405 provided to 407 is a feature vector.

At 407, the results of performing the deep learning analysis on the sensor data is provided to vehicle control. In some embodiments, the results are post-processed. For example, the results of one or more different neural networks for input from one or more different sensors may be combined. In some embodiments, the vehicle control is implemented using a vehicle control module to control the operation of the vehicle. For example, the vehicle control is able to modify the speed, steering, acceleration, braking, etc. of the vehicle for autonomous driving. In some embodiments, the vehicle control may enable or disable the turn signals, brakes lights, headlights, and/or operate other controls/signals of the vehicle including network controls such as sending network messages via a wireless network such as a WiFi or cellular network. In various embodiments, the vehicle control may not be enabled to actively control the vehicle, for example, when an autonomous driving feature is disabled. For example, the deep learning analysis at 401 and 403 is performed to provide results as input to the trigger classifier in order to identify potential training data even when the autonomous driving system is not actively controlling the vehicle.

At 409, a determination is made whether the layer of the neural network and trigger conditions are appropriate for applying the trigger classifier. For example, the trigger properties indicate the conditions required for applying the trigger classifier. Examples of conditions include whether the length of time since the last capture has exceeded a minimum amount of time, whether a minimum length of time driving has elapsed, whether the time of day is within a certain range, etc. Examples of different times of day may include dawn, dusk, daytime, nighttime, etc. Additional conditional requirements may be based on the location, the weather, road conditions, road type, vehicle type, disengagement of an autonomous driving feature, steering angle (e.g., exceeding a steering angle threshold), change in acceleration, activation of the brakes, or other appropriate feature. Examples of different weather conditions may include snow, hail, sleet, rain, heavy rain, overcast, sunny, cloudy, foggy, etc. Different conditions may be specified by the trigger properties. In some embodiments, different use cases may utilize different trigger properties and the intermediate result of different layers of the neural network. For example, some use cases may be more efficient and produce high quality results using the intermediate result of a latter layer of the neural network. Other use cases may require an earlier intermediate result in order to identify useful examples of sensor data that meet the use case. In some cases, the trigger properties used to specify the conditions to apply the trigger classifier can be nested using multiple conditional checks and/or logical operators such as AND and OR operators.

At 411, a trigger classifier score is determined. For example, a trigger classifier score is determined by applying the trigger classifier to the intermediate results of the neural network. In some embodiments, the application of the trigger classifier utilizes a weighted vector and an optional bias to determine the classifier score associated with the sensor data. In some embodiments, the trigger classifier is a support vector machine or a neural network. In some embodiments, the performance of the trigger classifier is improved by running the classifier on a customized artificial intelligence (AI) processor. For example, an AI processor can perform a dot product operation on two vectors in very few cycles and/or multiple dot products with limited wasted cycles. In some embodiments, the determined classifier score is a floating point number that represents the likelihood the sensor data is a positive (or negative) example of the targeted use case. For example, a particular range such as between −1 and +1 may be used to represent the likelihood the sensor data is a negative or positive example of the targeted use case.

At 413, a determination is made whether the classifier score exceeds a threshold and whether required trigger conditions are met. For example, in some embodiments, a classifier score is compared to a threshold value. In the event the classifier score exceeds the threshold value, processing continues to 415. In the event the classifier score does not exceed the threshold value, processing continues to 403. In some embodiments, additional trigger required conditions may be applied after the classifier score is determined. For example, the determined classifier score may be compared to previously determined classifier scores within a certain time window. As another example, the determined classifier score may be compared to previously determined scores from the same location. As another example, sensor data may be required to meet both a time condition and a location condition. For example, only sensor data with the highest score from the same location within the last 10 minutes may be retained as potential data. In various embodiments, the conditions may include trigger properties that function as a filter to either transmit or not transmit the sensor data. In some embodiments, the conditions at 413 are optional and only the classifier score is compared to the threshold.

In some embodiments, a separate threshold exists for both positive and negative examples. For example, a threshold of +0.5 and −0.5 may be utilized to identify positive and negative sensor data as potential training data. Classifier scores between +0.5 and 1.0 are used to identify positive examples and classifier scores between −1.0 and −0.5 are used to identify negative examples. In some embodiments, only positive examples are retained for transmittal.

At 415, the identified sensor data is transmitted. For example, the sensor data identified is transmitted to a computer server (e.g., the training data generation system 120) where it may be used to create training data. In various embodiments, the training data includes a training data set and a validation data set. In some embodiments, the sensor data transmitted includes metadata. Examples of metadata may include the time of data, a timestamp, the road conditions, the weather conditions, the location, the vehicle type, whether the vehicle is a left-hand drive or right-hand drive vehicle, the classifier score, the use case, an identifier of the neural network, an identifier of the trigger classifier, a firmware version associated with the autonomous driving system, or other appropriate metadata associated with the sensor data and/or vehicle. In some embodiments, the time of day may indicate a period of time such as dusk, dawn, night, daylight, full moon, solar eclipse, etc. For example, an identifier of the neural network and/or the trigger classifier may be transmitted to identify the particular trained machine learning model used for training the trigger classifier and used in determining the classifier score. In some embodiments, the sensor data and/or metadata is first compressed before being transmitted. In some embodiments, the sensor data is sent in batches to more efficiently transfer the sensor data. For example, compression of multiple images of sensor data is performed and a series of sensor data is transmitted together.

Figure 5:
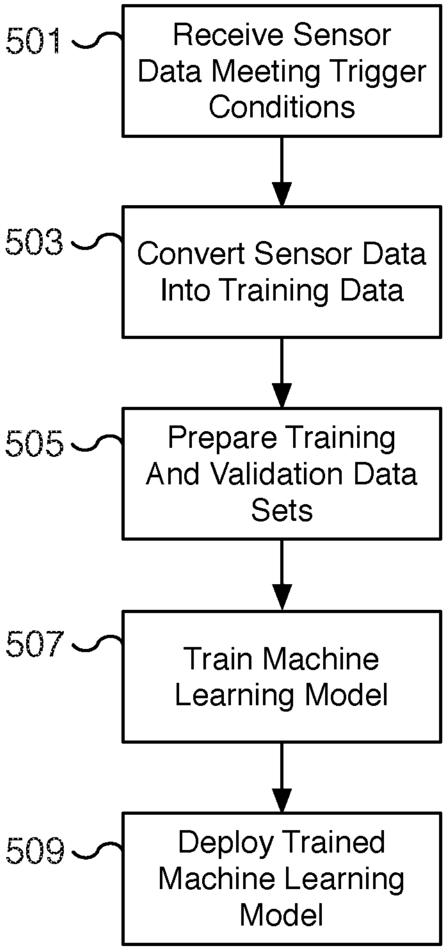
FIG. 5 is a flow diagram illustrating an embodiment of a process for deploying training data from data corresponding to use cases identified by a trigger classifier.

FIG. 5 is a flow diagram illustrating an embodiment of a process for creating training data from data corresponding to use cases identified by a trigger classifier. For example, sensor data received is processed to create training data for training a machine learning model. In some embodiments, the sensor data corresponds to driving data captured via an autonomous driving system utilizing a trigger classifier. In some embodiments, the sensor data is received using the process of FIG. 4 by a trigger classifier trained using the process of FIG. 3. In some embodiments, the sensor data corresponds to sensor data captured based on particular use cases, such as the identification of a fork in the road, an on ramp, an off ramp, a tunnel entrance, etc. In some embodiments, the sensor data received corresponds to only positive examples of the use case. In some embodiments, the sensor data includes both positive and negative examples. In various embodiments, the sensor data includes metadata such as the classifier score, the location, the time of day, or other appropriate metadata.

At 501, sensor data meeting trigger conditions is received. For example, sensor data is received that corresponds to a particular target use case and may be used as potential training data. In various embodiments, the sensor data is in the format that the machine learning model uses as input. For example, the sensor data may be raw or processed image data. In some embodiments, the data is data captured from ultrasonic sensors, radar, LiDAR sensors, or other appropriate technology. In various embodiments, the trigger conditions are specified using a trigger classifier and trigger properties as described with respect to FIGS. 2-4.

At 503, the sensor data is converted into training data. For example, the sensor data received at 501 includes data identified as potentially useful training data. In some embodiments, the received sensor data is compressed to improve the efficiency for transmitting the data from a remotely located vehicle and is first uncompressed. In some embodiments, the data is reviewed to determine whether the sensor data accurately represents the target use case. For example, a targeted use case for identifying examples of a tunnel exit is reviewed to determine whether the raw sensor data is indeed that of a tunnel exit. In some embodiments, a highly accurate machine learning model is used to confirm whether the sensor data represents the targeted use case. In some embodiments, a human reviews and confirms whether the sensor data represents the targeted use case. In some embodiments, the useful data for training is annotated. For example, the data may be marked as either a positive or negative example. In some embodiments, the data is annotated for the target object and may be labeled. For example, lane markers, signs, traffic lights, etc. may be annotated depending on the target use case. In various embodiments, the annotation may be used for training and/or verification of the trained machine learning model.

At 505, the training data converted at 503 is prepared as training and validation data sets. In various embodiments, the converted sensor data at 503 is prepared into a data set for training and a validation data set for validating the machine learning model. In some embodiments, the training data of 503 is merged into existing training data sets. For example, an existing training data set applicable for most use cases is merged with the newly converted training data for improved coverage of a particular use case. The newly converted training data is useful for improving the accuracy of the model in identifying the particular use case. In some embodiments, some portions of the existing training data are discarded and/or replaced with the new training data.

At 507, a machine learning model is trained. For example, a machine learning model is trained using the data prepared at 505. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data.

At 509, the trained machine learning model is deployed. For example, the trained machine learning model is installed on a vehicle as an update for the autonomous learning system. For example, an over-the-air update can be used to install the new model. In some embodiments, the update is a firmware update transmitted using a wireless network such as a WiFi or cellular network. In some embodiments, the new model is utilized for training new trigger classifiers. In various embodiments, existing trigger classifiers based on the old model are expired and new trigger classifiers are deployed based on the newly trained model. In some embodiments, the new machine learning model is installed when the vehicle is serviced.

Figure 6:
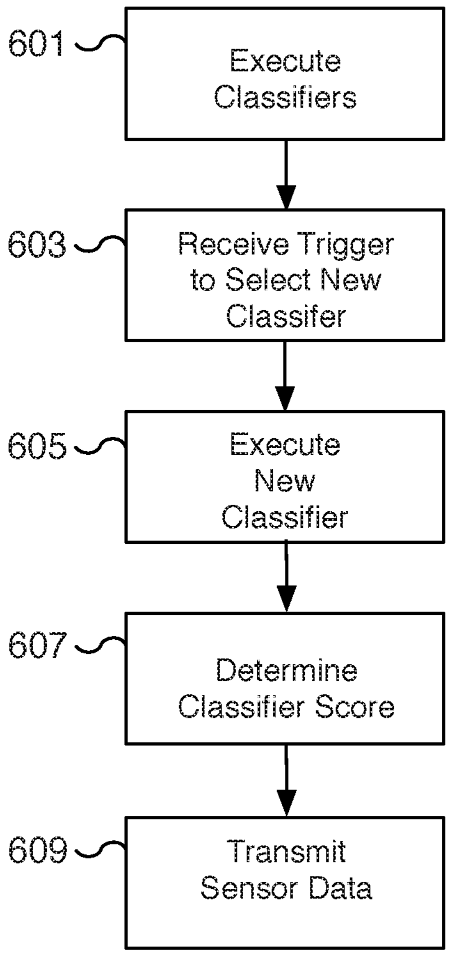
FIG. 6 is a flow diagram illustrating an embodiment of a process for executing a selection of a classifier on a vehicle and transmitting sensor data.

FIG. 6 is a flow diagram illustrating an embodiment of a process for causing selection of a classifier on a vehicle. The process may optionally be implemented by a vehicle, such as a vehicle of one or more processors. For example, a vehicle may have stored a multitude of classifiers. In this example, the vehicle may execute a subset of the classifiers to conserve processing resources. For example, the vehicle may determine classifier scores for only the subset. As described in FIG. 1B, the vehicle may update the subset periodically (e.g., select a new classifier after a threshold amount of time). In some embodiments, the vehicle may receive information from an outside system (e.g., system 120) identifying that the vehicle is to execute one or more specific classifiers.

At block 601, the vehicle executes classifiers. As described above, the vehicle may obtain sensor data and determine classifier scores based on the sensor data.

At block 603, the vehicle receives a trigger to select a new classifier. The vehicle may monitor its location via, at least, a global navigation satellite system (GNSS) receiver. In some embodiments, the vehicle may have access to map information. The map information may identify certain features or use cases for which it may be advantageous to obtain training data. As an example, the map information may identify tunnel exits. As another example, the map information may identify a partially occluded or hidden side-road. As another example, the map information may identify a location of a particular style or form of bike lane (e.g., a raised or offset bike lane). The vehicle may determine when it is proximate (e.g., with a threshold distance) of a particular feature or use case. The vehicle may then obtain information identifying a new classifier which associated with a particular feature or use case. This new classifier may then be executed by the vehicle to determine classifier scores for received sensor data.

Additionally, the vehicle may transmit location information to the outside system. The outside system may then transmit information to the vehicle regarding one or more new classifiers which the vehicle is to execute. For example, the outside system may transmit a unique identifier associated with each classifier. As described in FIG. 1B, the outside system may have received information from a same classifier executing on at least a particular number of vehicles (e.g., 1, 3, 10, 20). These vehicles may have been within a threshold distance (e.g., radius) of each other, such that the outside system determines the existence of a feature or use case proximate to their location. Thus, the outside system may instruct the vehicle to execute the same classifier if it is within a threshold distance of location. In this way, the outside system can obtain sensor data associated with this classifier.

At block 605 the vehicle executes the new classifier. As described herein, the new classifier may obtain information from an intermediate layer of a machine learning model (e.g., convolutional neural network). At block 607, the vehicle then determines classifier scores. At block 609, the vehicle then transmits sensor data (e.g., images) based on a classifier score exceeding a threshold. As describe above, the sensor data may be transmitted with metadata.

Figure 7:
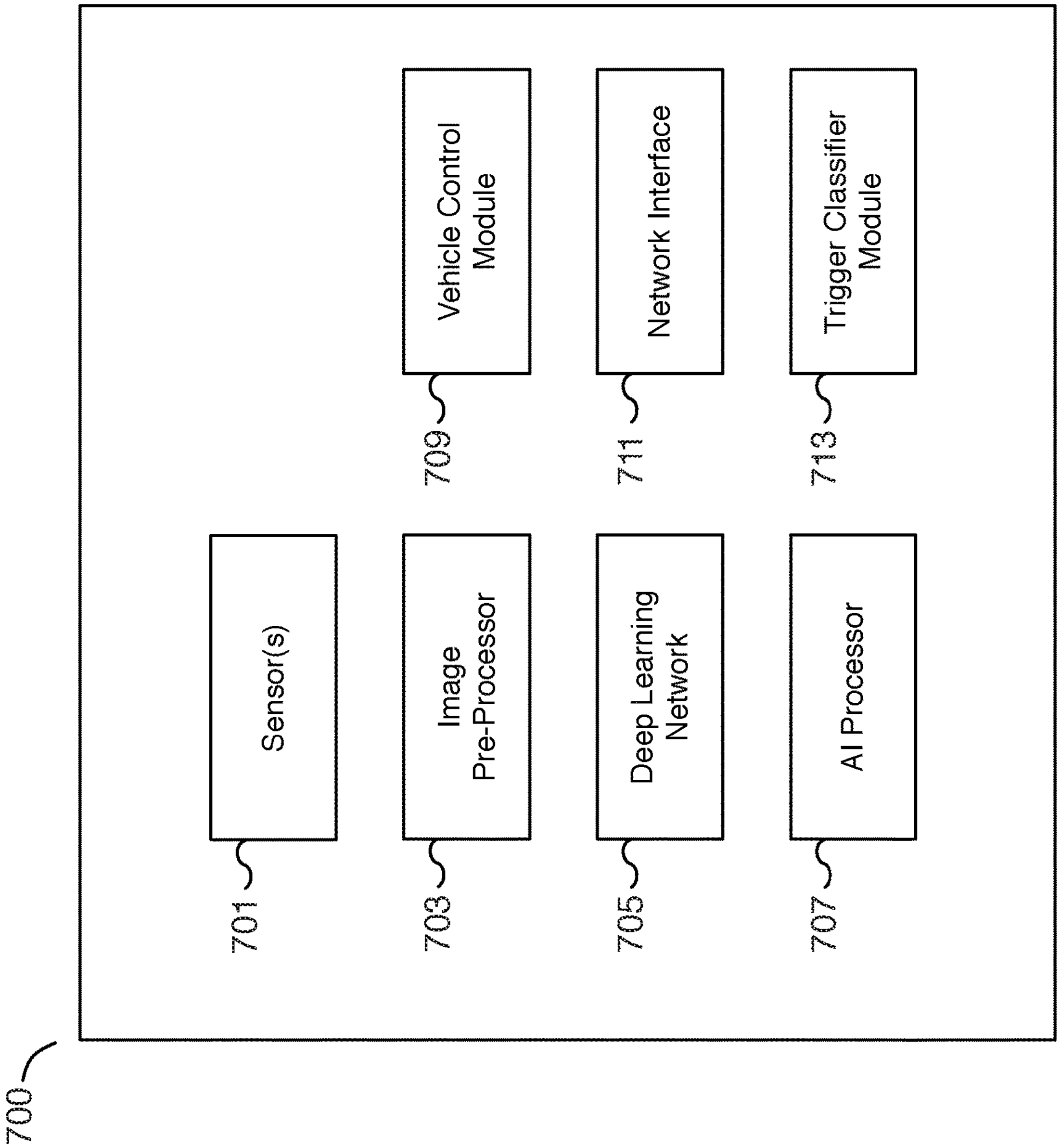
FIG. 7 is a block diagram illustrating an embodiment of a deep learning system for identifying potential training data.

FIG. 7 is a block diagram illustrating an embodiment of a deep learning system for identifying potential training data. For example, the block diagram includes different components of a deep learning system connected to a trigger classifier for autonomous driving where a subset of the sensor data captured for autonomous driving is identified as potential training data. In some embodiments, the deep learning system may passively analyze sensor data and the intermediate output of a layer of the deep learning system is used as an input to a trigger classifier. In some embodiments, the deep learning system actively analyzes and controls the operation of the vehicle while also identifying and retaining potentially useful sensor data for creating additional training data. In some embodiments, the autonomous driving system is utilized for self-driving or driver-assisted operation of the vehicle. In various embodiments, the processes of FIGS. 2-6 utilize a deep learning system and/or components of a system such as the one described in FIG. 7.

In the example shown, deep learning system 700 is a deep learning network that includes sensors 701, image pre-processor 703, deep learning network 705, artificial intelligence (AI) processor 707, vehicle control module 709, network interface 711, and trigger classifier module 713. In various embodiments, the different components are communicatively connected. For example, sensor data from sensors 701 is fed to image pre-processor 703. Processed sensor data of image pre-processor 703 is fed to deep learning network 705 running on AI processor 707. The output of deep learning network 705 running on AI processor 707 is fed to vehicle control module 709. Intermediate results of deep learning network 705 running on AI processor 707 are fed to trigger classifier module 713. The sensor data that triggers retention for transmittal by trigger classifier module 713 is sent via network interface 711. In some embodiments, trigger classifier module 713 runs on AI processor 707. In various embodiments, network interface 711 is used to communicate with remote servers, to make phone calls, to send and/or receive text messages, to transmit sensor data identified by trigger classifier module 713, etc. based on the autonomous operation of the vehicle and/or the results of trigger classifier module 713. In some embodiments, deep learning system 700 may include additional or fewer components as appropriate. For example, in some embodiments, image pre-processor 703 is an optional component. As another example, in some embodiments, a post-processing component (not shown) is used to perform post-processing on the output of deep learning network 705 before the output is provided to vehicle control module 709.

In some embodiments, sensors 701 include one or more sensors. In various embodiments, sensors 701 may be affixed to a vehicle, at different locations of the vehicle, and/or oriented in one or more different directions. For example, sensors 701 may be affixed to the front, sides, rear, and/or roof, etc. of the vehicle in forward-facing, rear-facing, side-facing, etc. directions. In some embodiments, sensors 701 may be image sensors such as high dynamic range cameras. In some embodiments, sensors 701 include non-visual sensors. In some embodiments, sensors 701 include radar, LiDAR, and/or ultrasonic sensors, among others. In some embodiments, sensors 701 are not mounted to the vehicle with vehicle control module 709. For example, sensors 701 may be mounted on neighboring vehicles and/or affixed to the road or environment and are included as part of a deep learning system for capturing sensor data.

In some embodiments, image pre-processor 703 is used to pre-process sensor data of sensors 701. For example, image pre-processor 703 may be used to pre-process the sensor data, split sensor data into one or more components, and/or post-process the one or more components. In some embodiments, image pre-processor 703 is a graphics processing unit (GPU), a central processing unit (CPU), an image signal processor, or a specialized image processor. In various embodiments, image pre-processor 703 is a tone-mapper processor to process high dynamic range data. In some embodiments, image pre-processor 703 is implemented as part of artificial intelligence (AI) processor 707. For example, image pre-processor 703 may be a component of AI processor 707.

In some embodiments, deep learning network 705 is a deep learning network for implementing autonomous vehicle control. For example, deep learning network 705 may be an artificial neural network such as a convolutional neural network (CNN) that is trained using sensor data and its output is provided to vehicle control module 709. In some embodiments, a duplicate of the neural network of deep learning network 705 is utilized for creating the trigger classifier of trigger classifier module 713.

In some embodiments, artificial intelligence (AI) processor 707 is a hardware processor for running deep learning network 705 and/or trigger classifier module 713. In some embodiments, AI processor 707 is a specialized AI processor for performing inference using a convolutional neural network (CNN) on sensor data. In some embodiments, AI processor 707 is optimized for the bit depth of the sensor data. In some embodiments, AI processor 707 is optimized for deep learning operations such as neural network operations including convolution, dot-product, vector, and/or matrix operations, among others. In some embodiments, AI processor 707 is implemented using a graphics processing unit (GPU). In various embodiments, AI processor 707 is coupled to memory that is configured to provide the AI processor with instructions which when executed cause the AI processor to perform deep learning analysis on the received input sensor data and to determine a machine learning result used to at least in part autonomously operate a vehicle. In some embodiments, AI processor 707 is configured to output the intermediate results of one or more layers of deep learning network 705 to trigger classifier module 713 for determining a classifier score.

In some embodiments, vehicle control module 709 is utilized to process the output of artificial intelligence (AI) processor 707 and to translate the output into a vehicle control operation. In some embodiments, vehicle control module 709 is utilized to control the vehicle for autonomous driving. In some embodiments, vehicle control module 709 can adjust the speed and/or steering of the vehicle. For example, vehicle control module 709 may be used to control a vehicle by braking, steering, changing lanes, accelerating, and merging into another lane, etc. In some embodiments, vehicle control module 709 is used to control vehicle lighting such as brake lights, turns signals, headlights, etc. In some embodiments, vehicle control module 709 is used to control vehicle audio conditions such as the vehicle's sound system, playing audio alerts, enabling a microphone, enabling the horn, etc. In some embodiments, vehicle control module 709 is used to control notification systems including warning systems to inform the driver and/or passengers of driving events such as a potential collision or the approach of an intended destination. In some embodiments, vehicle control module 709 is used to adjust sensors such as sensors 701 of a vehicle. For example, vehicle control module 709 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 709 may be used to change parameters of image pre-processor 703 such as modifying the frequency range of filters, adjusting feature and/or edge detection parameters, adjusting channels and bit depth, etc. In various embodiments, vehicle control module 709 is used to implement self-driving and/or driver-assisted control of a vehicle.

In some embodiments, network interface 711 is a communication interface for sending and/or receiving data including voice data. In various embodiments, a network interface 711 includes a cellular or wireless interface for interfacing with remote servers, to connect and make voice calls, to send and/or receive text messages, to transmit sensor data, to receive updates to the autonomous driving system including trigger classifiers and properties, etc. For example, network interface 711 may be used to receive an update for the instructions and/or operating parameters for sensors 701, image pre-processor 703, deep learning network 705, AI processor 707, vehicle control module 709, and/or trigger classifier module 713. For example, a machine learning model of deep learning network 705 may be updated using network interface 711. As another example, network interface 711 may be used to update firmware of sensors 701 and/or operating parameters of image pre-processor 703 such as image processing parameters.

In some embodiments, network interface 711 is used to transmit sensor data identified by trigger classifier module 713. For example, sensor data corresponding a particular use case identified by a trigger classifier and meeting the conditions of the associated trigger properties is transmitted via network interface 711 to a computer server, such as a remote computer server. In some embodiments, the trigger classifier and trigger properties are updated via network interface 711. The updated trigger classifier and trigger properties are installed to trigger classifier module 713 and used to identify and retain sensor data corresponding to a particular use case.

In some embodiments, network interface 711 is used to make emergency contact with emergency services in the event of an accident or near-accident. For example, in the event of a collision, network interface 711 may be used to contact emergency services for help and may inform the emergency services of the location of the vehicle and collision details. In various embodiments, network interface 711 is used to implement autonomous driving features such as accessing calendar information to retrieve and/or update a destination location and/or expected arrival time.

In some embodiments, trigger classifier module 713 is utilized to identify and retain sensor data corresponding to a particular use case. For example, trigger classifier module 713 determines a classifier score for a data captured by one or more sensors of sensors 701. The classifier score is compared to a threshold and may be retained and transmitted via network interface 711 to a remote computer server. In some embodiments, trigger classifier module 713 utilizes trigger properties to determine whether the appropriate conditions are met for determining a classifier score and/or retaining sensor data that meets a classifier score threshold. In some embodiments, the trigger classifier module is a support vector machine and receives the intermediate output of deep learning network 705 as an input representative of sensor data of sensors 701. In some embodiments, trigger classifier module 713 is configured to receive the intermediate results of one or multiple layers of deep learning network 705. The output of the particular layer may depend on the trigger classifier and/or trigger properties. For example, some use cases may use an earlier intermediate result and others may utilize a later intermediate result. In some embodiments, AI processor 707 may be utilized to perform the processing of trigger classifier module 713. In various embodiments, the sensor data identified by trigger classifier module 713 is used to create new training data sets for identifying particular use cases.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It will also be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module, the remote processing module, and remote data repository. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the one or more innovations have been described with reference to specific embodiments thereof. It will, however, be evident that various modifications and changes may be made thereto without departing from the broader spirit and scope of the innovations. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method, comprising:

receiving, by at least one processor, sensor data representing surroundings of a vehicle;

executing, by the at least one processor, a first neural network to the sensor data to cause the first neural network to generate an intermediate result at an intermediate layer of the first neural network independent from outputs generated by trigger classifiers configured to receive the intermediate result as input, the first neural network configured to process a set of features of the surroundings of the vehicle to generate an output that is not based on outputs generated by trigger classifiers;

determining, by the at least one processor, that the intermediate result meets a first trigger condition of one or more trigger conditions indicating that the first neural network cannot make a predetermined classification;

in response to determining that the intermediate result meets the first trigger condition, executing, by the at least one processor, a second neural network comprising a trigger classifier independently trained remote from the vehicle using previous intermediate results for a target use case to process the intermediate result as an input from the first neural network to cause the trigger classifier to determine a classifier score for the sensor data associated with the intermediate result, the classifier score indicating a real-world object, a scenario, or a feature in the surroundings of the vehicle;

determining, by the at least one processor, to transmit via a computer network at least a portion of the sensor data associated with the intermediate result in response to determining the classifier score, wherein the determining to transmit includes comparing the classifier score with a threshold value; and transmitting, by the at least one processor, the at least a portion of the sensor data associated with the intermediate result for use as training data for retraining the first neural network or a different neural network.

2. The method of claim 1, wherein the intermediate result is an output of an intermediate layer of the first neural network.

3. The method of claim 2, wherein the intermediate result is an output of a second to last layer of the first neural network.

4. The method of claim 1, wherein the first neural network is a convolutional neural network.

5. The method of claim 1, wherein the trigger classifier is trained using a training data set at least partially analyzed by a third neural network using a machine learning model based on the first neural network used to determine the classifier score.

6. The method of claim 5, wherein the trigger classifier is trained using an input vector, wherein the input vector is an output of a layer of the third neural network.

7. The method of claim 6, wherein the layer of the third neural network is dynamically selected.

8. The method of claim 6, wherein the trigger classifier is transmitted wirelessly to a vehicle applying the second neural network.

9. The method of claim 1, wherein the trigger classifier has been generated based on an identified improvement need for the first neural network.

10. The method of claim 1, wherein the trigger classifier is used to identify one or more of the following: a tunnel entrance, a tunnel exit, a fork in a road, an obstacle in a road, road lane lines, or drivable space.

11. The method of claim 1, further comprising determining whether to apply the trigger classifier based on one or more required conditions.

12. The method of claim 11, wherein the one or more required conditions are based on one or more of the following: a length of time driving, a minimum time since a last retained sensor data of the trigger classifier, a disengagement event associated with an autonomous driving feature, a vehicle type, a steering angle threshold, or a road type requirement.

13. The method of claim 1, wherein the trigger classifier specifies a particular layer of the second neural network from which to receive the intermediate result.

14. The method of claim 1, further comprising transmitting at least the portion of the sensor data and metadata identifying one or more of the following: a classifier score, a location, a timestamp, a road type, a length of time since a previously transmitted sensor data, or a vehicle type.

15. The method of claim 1, further comprising transmitting at least the portion of the sensor data and operating conditions of a vehicle identifying one or more of the following: a vehicle speed, a vehicle acceleration, a vehicle braking, or a vehicle steering angle.

16. The method of claim 1, further comprising receiving via the computer network the trigger classifier represented by a vector of weights.

17. The method of claim 16, wherein the trigger classifier is represented by the vector of weights and a bias.

18. A computer program product, the computer program product being embodied in a non-transitory computer readable storage medium and comprising computer instructions for:

receiving sensor data representing surroundings of a vehicle;

executing a first neural network to the sensor data to cause the first neural network to generate an intermediate result at an intermediate layer of the first neural network independent from outputs generated by trigger classifiers configured to receive the intermediate result as input, the first neural network configured to process a set of features of the surroundings of the vehicle to generate an output that is not based on outputs generated by trigger classifiers;

determining that the intermediate result meets a first trigger condition of one or more trigger conditions;

in response to determining that the intermediate result meets the first trigger condition, executing, a second neural network comprising a trigger classifier independently trained remote from the vehicle using previous intermediate results for a target use case to process the intermediate result as an input from the first neural network to cause the trigger classifier to determine a classifier score the classifier score for the first sensor data, the classifier score indicating a real-world object, a scene associated with the intermediate result, or a feature in the surroundings of the vehicle;

determining to transmit via a computer network at least a portion of the sensor data associated with the intermediate result in response to determining the classifier score, wherein determining to transmit includes comparing the classifier score with a threshold value; and transmitting the at least a portion of the sensor data associated with the intermediate result for use as training data for retraining the first neural network or a different neural network.

19. A system, comprising:

a sensor on a vehicle;

an artificial intelligence processor;

a vehicle control module;

an image signal processor configured to:

receive an image captured using the sensor representing surroundings of the vehicle;

process the image to generate a processed image; and provide the processed image to a first neural network;

a memory coupled with the artificial intelligence processor, wherein the memory is configured to provide the artificial intelligence processor with instructions which when executed cause the artificial intelligence processor to:

receive the processed image;

perform an inference using the first neural network on the processed image by executing the first neural network to using the processed image to cause the first neural network to generate an intermediate result at an intermediate layer of the first neural network and an inference result that is not generated based on the intermediate result, the first neural network configured to process a set of features of the surroundings of the vehicle;

determine that the intermediate result of the first neural network meets a first trigger condition of one or more trigger conditions;

in response to determining that the intermediate result of the first neural network meets the first trigger condition, provide the intermediate result of the first neural network to a trigger classifier independently trained remote from the vehicle using previous intermediate results for a target use case to process the intermediate result as an input from the first neural network, wherein the trigger classifier is used to determine a classifier score corresponding to the image associated with the intermediate result, the classifier score indicating a real-world object, a scenario, or a feature in the surroundings of the vehicle; and provide an inference result of the first neural network to the vehicle control module to at least in part autonomously operate the vehicle; and a network interface configured to:

transmit at least a portion of the image associated with the intermediate result based at least in part on the classifier score for retraining the first neural network or a different neural network.

20. The method of claim 1, wherein the one or more trigger conditions correspond to one or more of whether a length of time since a last capture has exceeded a minimum amount of time, whether a minimum length of time driving has elapsed, or whether a time of day is within a certain range.

* * * * *